US007073013B2

(12) United States Patent
Lasser

(10) Patent No.: US 7,073,013 B2
(45) Date of Patent: Jul. 4, 2006

(54) MASS STORAGE DEVICE WITH BOOT CODE

(75) Inventor: Menahem Lasser, Kohav Yair (IL)

(73) Assignee: H-Systems Flash Disk Pioneers Ltd., Kfar Sana (IL)

( * ) Notice: Subject to any disclaimer, the term of this patent is extended or adjusted under 35 U.S.C. 154(b) by 267 days.

(21) Appl. No.: 10/611,940

(22) Filed: Jul. 3, 2003

(65) Prior Publication Data

US 2005/0005076 A1    Jan. 6, 2005

(51) Int. Cl.
G06F 12/00 (2006.01)
G06F 9/00 (2006.01)

(52) U.S. Cl. ............... 711/102; 711/154; 711/115; 717/174; 710/36; 713/2

(58) Field of Classification Search ............... None
See application file for complete search history.

(56) References Cited

U.S. PATENT DOCUMENTS 5,542,082 A * 7/1996 Solhjell ................ 711/115
5,815,706 A * 9/1998 Stewart et al. ............ 713/2
6,078,967 A * 6/2000 Fulghum ................ 710/2
6,601,139 B1 * 7/2003 Suzuki .................. 711/115
6,757,751 B1 * 6/2004 Gene .................... 710/36
2003/0172261 A1 * 9/2003 Lee et al. ............... 713/1
2004/0042735 A1 * 3/2004 Ma ...................... 385/88
2004/0083473 A1 * 4/2004 Thomas et al. ........... 717/174
2005/0021968 A1 * 1/2005 Zimmer et al. .......... 713/176

* cited by examiner

Primary Examiner—Mano Padmanabhan
Assistant Examiner—Craig E Walter

(74) Attorney, Agent, or Firm—Mark M. Friedman

(57) ABSTRACT

A memory device includes a first, directly executable memory with boot code, a second memory with operating system code, and a common connector. When the device is connected to a computer that lacks a BIOS of its own, the computer boots from the first memory and downloads the operating system from the second memory. A user of a system that includes a plurality of the memory devices and a computer that lacks a BIOS selects an operating system by reversibly connecting the appropriate memory device to the computer. The memory device also serves as a security key for a computer that lacks a BIOS.

31 Claims, 3 Drawing Sheets

MASS STORAGE DEVICE WITH BOOT CODE

FIELD AND BACKGROUND OF THE INVENTION

The present invention relates to mass storage devices for computers and, more particularly, to a USB mass storage device that also includes directly executable boot code.

FIG. 1 is a partial schematic block diagram of a generic prior art personal computer (PC) 10. PC 10 includes various internal components: a central processing unit (CPU) 12, a non-volatile Basic Input Output System (BIOS) device 14, a random access memory (RAM) 16, a hard disk controller 20, several input-output controllers 24 (of which only one is shown) and a USB hub 26, all communicating with each other via an internal bus 30. Hard disk controller 20 drives a hard disk 18. Input-output controller 24 drives an input/output device such as a display screen, a keyboard or a mouse. USB hub 26 facilitates communication with reversibly attachable peripheral devices according to the USB standard protocol, via a USB connector 28.

When PC 10 is powered up, CPU 12 starts fetching code instructions from an address that is predetermined by the manufacturer of CPU 12. For example, in the original IBM PC that used the Intel 8088 microprocessor as its CPU 12, that address was 0FFFF0H. In other microprocessors, the address is 0. In still other microprocessors, the address is selectable by a system designer from a small number of alternatives by strapping some of the pins of the microprocessor during power-up to specific configurations of high and low voltage values.

PC 10 must include a component that responds to these initial CPU 12 fetch cycles and returns the correct commands (opcodes) that cause CPU 12 to start the powering-up, or "booting", process. If such a component is absent, then CPU 12 receives unpredictable or meaningless data that CPU 12 treats as executable code. Within a few machine cycles, CPU 12 either will be stuck or will be executing useless commands and will be unable to proceed beyond this stage. BIOS 14 is that component.

BIOS 14 is a directly executable, non-volatile memory device, such as a read-only memory or a flash memory, that contains the initial code ("boot code") that CPU 12 must execute. Typically, the bulk of the operating software of PC 10 (including the operating system (OS) of PC 10 and application programs such as word processors) does not reside in BIOS 14, which is much to small to store all this software, but rather in a high-capacity mass storage device such as hard disk 18. Unlike BIOS 14, hard disk 18 is not directly executable. In addition, hard disk 18 must be accessed by CPU 12 via hard disk controller 20. RAM 16 serves as the directly executable device from which code stored on hard disk 18 is executed: code stored on hard disk 18 is copied from hard disk 18 to RAM 16 and only then is executed by CPU 12. One of the functions of the boot code of BIOS 14 is to instruct hard disk controller 20 to fetch code from hard disk 18, to load the fetched code into RAM 16 and to direct CPU 12 to start executing the loaded code. The portion of the boot code that performs the function of reading from the hard disk is called the "hard disk driver".

Typically, the code that is loaded by BIOS 14 is the OS, or at least a part of the OS that is called the "kernel". Loading the OS typically is done in several stages. First, BIOS 14 loads a first portion of the OS that is called the "boot loader", then the boot loader loads a second portion of the OS, etc. until all the required OS code is available in RAM 16. Once the OS is loaded, the OS takes control of PC 10 and executes all the tasks that are to be executed by PC 10. In some PCs 10, BIOS 14 is not used after this initial stage: all the functionality of BIOS 14 is replaced by the OS. For example, the OS includes its own hard disk driver that is used henceforth instead of the hard disk driver of BIOS 14. In other PCs 10, the OS continues to rely on some services of BIOS 14 even after the system is fully up. For example, the OS hard disk manager could use the hard disk driver of BIOS 14 to carry out low-level disk access functions. In any case, when PC 10 is reset, either a cold reset by turning the power off and on again or a warm reset by requesting system re-initialization from the keyboard, CPU 12 again jumps to the initial start-up address and BIOS 14 responds by providing the correct initial code bytes for repeating the full system booting process.

Most commonly, a magnetic hard disk is used as hard disk 18. In some applications, for example when high reliability or compactness is desired, a flash disk sometimes is used for mass storage. Magnetic hard disks 18 and flash hard disks 18 require different kinds of controllers 20 and consequently different software disk drivers. In addition, NAND flask disks, like magnetic hard disks, are not directly executable. NOR flash disks are directly executable, but are less frequently used as hard disks 18 because of cost and write performance considerations.

In recent years, USB disks have come into use as mass storage devices. A USB disk is a mass storage device that interfaces to a host device using the USB standard protocol. One major advantage of such a device is that it can be disconnected from the host and reconnected to the host even while the host is operating. So, for example, there is no need to power down PC 10 to attach a USB disk to PC 10 at USB connector 28 or to detach a USB disk from USB connector 28. Some USB disks, such as the flash-based DiskOnKey™ available from M-Systems Flash Disk Pioneers, Ltd. of Kfar Saba, Israel, are small and pocketable, and so are very convenient to use as removable and portable mass storage media. Because the USB protocol is a serial protocol that is not compatible with direct execution, USB disks are not directly executable by CPU 12. USB disks require a driver for accessing their contents. Such a driver typically is part of the OS. For example, all Microsoft Windows™ operating systems, from Windows 98™ onwards, include a USB driver.

Some PC vendors claim that they can boot their systems from a USB disk. What they really mean is that the USB disk assumes the role of hard disk 18: the OS resides on the USB disk, is loaded to RAM 16 from the USB disk and is executed from RAM 16. Obviously, such a system must include a separate BIOS 14 and this BIOS 14 must include a USB driver. Otherwise, there is no way to access the OS code in the USB disk. There is currently no way to boot a system from a USB disk without the system including a separate BIOS 14 with its own USB driver. This is why some PCs 10 do not support booting from USB disks: their BIOSs 14 either completely lack USB support or lack support for USB disks (the USB "Mass Storage Class" functionality).

There is thus a widely recognized need for, and it would be highly advantageous to have, a USB disk that allows a PC to boot without having a BIOS of its own. This would solve the compatibility and interoperability problems encountered today, when one never can be sure, when s/he inserts his/her portable USB disk into the USB connector of an unfamiliar PC and turns on the power, whether the PC will boot the OS that resides on the USB disk, will boot a different OS that resides on the PC's internal hard disk, or will not boot at all.

Additionally, such a "true boot" device could be used as a security key for operating a computer. Powering up a computer without such a bootable USB disk inserted in the USB connector would not render the computer operable.

SUMMARY OF THE INVENTION

According to the present invention there is provided a memory device including: (a) a first, directly executable memory for storing boot code of a computer; (b) a second memory; and (c) a single connector for operationally connecting the two memories to the computer.

According to the present invention there is provided a computer system including: (a) a processor; (b) a bus, permanently operationally connected to the processor; and (c) at least one memory device including: (i) a respective first, directly executable memory, (ii) a respective second memory; and (iii) a respective connector for reversibly establishing an operational connection between the two respective memories and the bus in order to exchange signals between the processor and the respective first and second memories.

According to the present invention there is provided a computer peripheral device including: (a) a first component; (b) a second component separate from the first component; (c) a connector for operationally connecting the first and second components to a computer; and (d) a single USB controller for supporting communication only between the first component and the computer.

According to the present invention there is provided a method of operating a computer, including the steps of: (a) providing at least one memory device including: (i) a respective first, directly executable memory, and (ii) a respective second memory; (b) for each at least one memory device, storing boot code of the computer in the respective first memory; (c) operationally connecting one of the at least one memory device to the computer; and (d) executing the boot code that is stored in the respective first memory of the one memory device, by the computer.

According to the present invention there is provided a method of securing a computer, including the steps of: (a) omitting a BIOS from the computer; (b) providing a memory device, separate from the computer, the memory device including a first, directly executable memory; (c) storing boot code of the computer in the first memory; and (d) reversibly operationally connecting the memory device to the computer.

The term "BIOS", as used herein, refers to any non-volatile memory device, for storing boot code of a computer, that is a permanently installed component of the computer.

A memory device of the present invention includes a first memory, a second memory, and a single connector for establishing a reversible or permanent operational connection between the two memories and a computer. The first memory is directly executable, preferably is read-only, and is used to store boot code of the computer. Preferably, the second memory is used to store an operating system of the computer, and could be, for example, a magnetic disk memory or a flash memory.

Preferably, the device also includes a USB controller for supporting communication between the second memory and the computer using the USB standard protocol. More preferably, at least one of the two memories then also stores a read-only USB driver.

Preferably, the connector includes two pluralities of pins. The first plurality of pins supports communication between the first memory and the computer. The second plurality of pins supports communication between the second memory and the computer. In one embodiment of the device, the two pluralities of pins are separate. In other words, the two pluralities of pins have no pins in common. In another embodiment of the device, at least one pin is shared by the two pluralities of pins. In the latter case, most preferably the device also includes a switch for alternately connecting the first memory or the second memory to the computer via the shared pin(s).

Most preferably, the first plurality of pins is for a first access protocol, for example a LPC protocol, that supports direct execution of the boot code from the first memory, and the second plurality of pins is for a second access protocol that is a serial access protocol, for example a USB protocol.

A computer system of the present invention includes a processor, a bus that is permanently operationally connected to the processor, and one or more memory devices of the present invention, with the connector of each memory device being for reversibly establishing an operational connection between the bus and the two respective memories of the memory device so that the processor can exchange signals with the two memories of the memory device via the bus. Note that the operational connection established by the connector typically is indirect, with other components also participating in the operational connection. For example, the two memories of a memory device of the present invention could be connected to the bus via a USB controller, the memory device connector of the present invention, a USB connector similar to USB connector 28, and a USB hub similar to USB hub 26. In the context of the computer system, the first memory need not store boot code of the computer; but it is preferred that the first memory does store boot code of the computer. It is further preferred that the computer system lack a BIOS.

It is further preferred that the second memory store an operating system for the computer system. More preferably, the computer system of the present invention includes a plurality of the memory devices. Most preferably, the operating systems stored on the second memories of the memory devices all are different.

Preferably, each memory device of the computer system includes a USB controller for supporting communication between the second memory of the memory device and the bus using the USB standard protocol.

A USB computer peripheral device of the present invention includes a first component, a second component separate from the first component, a connector for establishing an operational connection, preferably a reversible operational connection, of the two components to a computer, and a single USB controller for supporting communication only between the first component and the computer. Preferably, the two components are memories: for example, the first component may be a magnetic disk memory or a flash memory; and the second component may be a directly executable memory, for example a read-only memory, for storing boot code, in which case it is preferred that the connector support a LPC protocol for the second component.

Preferably, the connector includes two pluralities of pins. The first plurality of pins supports communication between the first component and the computer. The second plurality of pins supports communication between the second component and the computer. In one embodiment of the device, the two pluralities of pins are separate. In another embodiment of the device, at least one pin is shared by the two pluralities of pins. More preferably, the device includes a switch for alternately connecting the first or second components to the computer via the shared pin(s). Preferably, the communication between the second component and the computer via the second plurality of pins multiplexes the second plurality of pins. Alternatively, the second plurality of pins includes separate respective pins for address signals and data signals.

The scope of the present invention includes a method of operating a computer. One or more memory devices are provided. Each memory device includes a respective first, directly executable memory and a respective second memory. Boot code of the computer is stored in the first memory. One of the memory devices is operationally connected, preferably reversibly, to the computer, which then executes the boot code that is stored in the first memory.

Preferably, a respective operating system of the computer is stored in the second memory of each memory device, and the executing of the boot code by the computer includes copying the operating system from the second memory to the computer. If more than one memory device is provided, it is preferred that all the operating systems be different. Most preferably, the boot code in each first memory includes driver code for the second memory, and the copying of the operating system to the computer includes executing at least a portion of the driver code. Optionally, the driver code is read-only driver code.

Preferably, when the computer executes the boot code that is stored in the first memory of the memory device that is connected thereto, the computer executes that boot code directly from that first memory. Alternatively, the computer executes only a portion of the boot code that is stored in that first memory directly from that first memory, copies a remainder of the boot code to a RAM, and executes that remainder directly from the RAM.

The scope of the present invention also includes a method of securing a computer. First, the BIOS of the computer is omitted, meaning that either the computer is configured a priori without a BIOS, or an existing BIOS is removed from the computer. A memory device is provided that includes a first, directly executable memory and, optionally, a second memory. Boot code of the computer is stored in the first memory, the memory device is reversibly operationally connected to the computer, and the computer executes the boot code that is stored in the first memory, preferably directly from the first memory. If the memory device includes the second memory, then, preferably, an operating system of the computer is stored in the second memory and the executing of the boot code includes copying the operating system from the second memory to the computer.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a USB disk that also includes a directly executable memory for storing boot code. Specifically, the present invention can be used to boot a computer that lacks a BIOS of its own.

The principles and operation of a USB disk according to the present invention may be better understood with reference to the drawings and the accompanying description.

Figure 1:
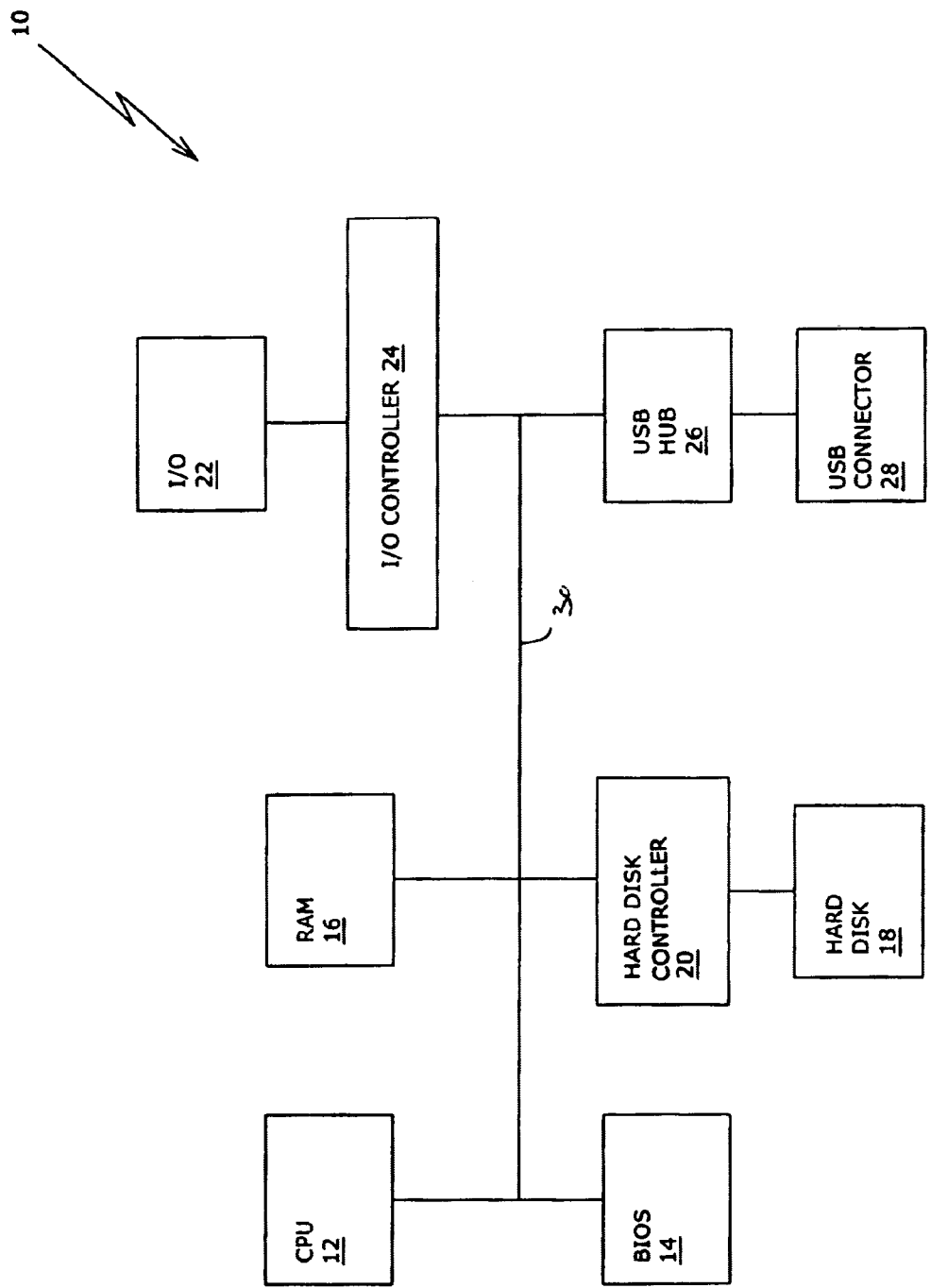
FIG. 1 is a partial schematic block diagram of a prior art PC.
Figure 2:
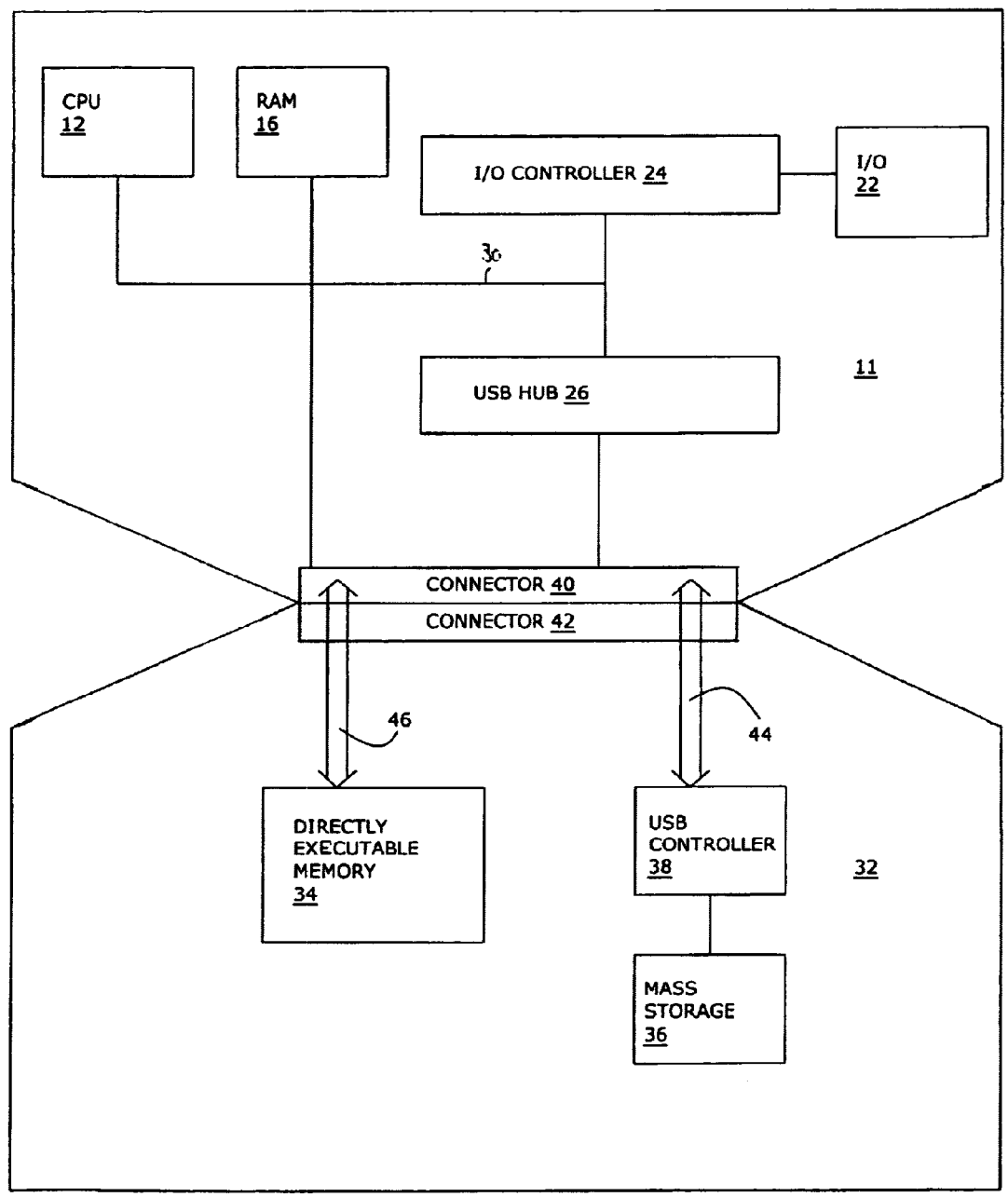
FIGS. 2 and 3 are partial schematic block diagrams of computer systems of the present invention.

Referring again to the drawings, FIG. 2 is a schematic block diagram of a basic USB disk 32 of the present invention, operationally connected to a PC 11. PC 11 is a modified version of PC 10. Specifically, PC 11 lacks both a BIOS and a hard disk. Instead, USB disk 32 includes a directly executable non-volatile memory 34 that substitutes for BIOS 14 and a mass storage device 36 that substitutes for hard disk 18. Specifically, boot code for PC 11 is stored in directly executable memory 34, and OS code for PC 11 is stored in mass storage device 36. USB disk 32 is operationally connected to PC 11 via connectors 40 and 42: connector 40 is a female connector that is part of PC 11, and connector 42 is a matching male connector that is part of USB disk 32. Directly executable memory 34 communicates with bus 30 using signals 46 of an appropriate direct execution protocol. Communication of mass storage device 36 with bus 30 is via signals 44 of a USB standard protocol, as facilitated by a USB controller 38 in USB disk 32 and by USB hub 26 in PC 11.

To support communication by both directly executable memory 34 and mass storage device 36, connector 42 has more than the four pins defined in the current version of the USB standard. Four of these pins (power, ground, +Data, –Data) are used for USB protocol signals 44. Other pins in connector 42 are used for signals 46 of a protocol that supports direct execution of code stored in directly executable memory 34 by CPU 12. In one embodiment of the present invention, this protocol is the simple non-multiplexed address lines plus data lines protocol, used by many ROM and NOR flash devices, that is used in the PC ISA bus. Under this protocol, connector 42 provides some pins for CPU 12 to drive an address value and provides other pins for directly executable memory 34 to drive a data value in return. Additional control pins, such as "Output Enable", may also be required depending on the configuration of bus 30 and on the way USB disk 32 is implemented. Because such an arrangement requires many pins and signals (for example, a full 16-bit interface of this type requires at least 32 pins), a more preferred embodiment of the present invention uses a multiplexed bus scheme, in which the address and data lines are shared, as in the PCI bus.

In order to be useful for a PC such as PC 11, USB disk 32 must adapt itself to the bus protocols used in typical PCs. One preferred direct execution protocol, that is both inexpensive in the number of pins it requires and also is compatible with PC architecture, is the LPC (acronym of "Low Pin Count") protocol. The LPC protocol is a directly executable bus interface protocol defined by Intel as a replacement for the obsolescent ISA bus of the first PC. The LPC protocol is supported by many PC chipsets. Even though the address and data values are exchanged over just four signals of the LPC bus, those PCs can execute code directly from storage devices located on this bus, as their internal chipsets include the right controller required for reading or writing via such a bus. Actually, in many cases, Intel has recommended placing its BIOS device on such a LPC bus. This LPC bus is guaranteed to be always accessible during boot time.

Like any USB disk, USB disk 32 of the present invention includes a USB controller (USB controller 38) and a mass storage memory (mass storage device 36), both of which operate exactly as in prior art USB disks. The new, innovative component of the present invention is directly executable non-volatile memory 34. Directly executable memory 34 is the component of USB disk 32 that responds to the initial fetch cycles of CPU 12. Directly executable memory 34 provides CPU 12 with the first code to be executed upon power up or reset. Directly executable memory 34 also stores the USB driver code that is required for loading the OS from mass storage device 36. As noted above, directly executable memory 34 substitutes for the missing BIOS of PC 11. Indeed, in this embodiment of the present invention, directly executable memory 34 must include code that does every task that must be carried out before the OS can be loaded, for example code for running built-in tests on RAM 16 to assure the correct operation of RAM 16 before the OS code can be loaded to RAM 16, exactly as would have been done by BIOS 14 of PC 10.

It is important to note that even though directly executable memory 34 and mass storage device 36 share a common connector 42, these two components have two separate interfaces to PC 11. Directly executable memory 34 uses a direct execution interface, as represented symbolically in FIG. 2 by double-headed arrow 46 that represents direct execution protocol signals. Mass storage device uses a USB interface, as represented symbolically in FIG. 2 by double-headed arrow 44 that represents USB protocol signals.

Many variations on the embodiments described above are possible. For example, many BIOS-based systems use "code shadowing". In code shadowing, the BIOS code copies itself to RAM and executes from RAM (except for the very initial section that does the copying operation). This improves system performance, because execution from RAM typically is faster than execution from read-only memory (ROM) or from flash memory, which are the types of memories typically used for BIOS. A preferred embodiment of USB disk 32 also uses shadowing: instead of running from directly executable memory 34, most of the boot code is copied to RAM 16 and is executed from RAM 16.

In another preferred embodiment of the present invention, within the architecture illustrated in FIG. 2, directly executable memory 34 does not store a full USB driver. Instead, directly executable memory 34 stores a simple USB driver with only the minimal read-only functionality needed to copy the OS from mass storage device 36. This reduces the amount of code that must be stored in directly executable memory 34. Of course, the OS includes a full USB driver with complete functionality.

USB disk 32 thus is a truly bootable USB disk that boots the OS in any PC that lacks a BIOS. The present invention is a truly portable solution that does not depend on the BIOS vendor implementing USB functionality correctly or at all. Everything needed for booting from USB disk 32 is contained within USB disk 32, so that once USB disk 32 has been tested at the production site and has operated correctly, USB disk 32 is guaranteed to always operate correctly in any PC 11 with the BIOS-less architecture illustrated in FIG. 2.

USB disk 32 is useful both as a removable disk, in which case the connection between connectors 40 and 42 is a reversible connection, and as a non-removable disk, in which case the connection between connectors 40 and 42 is a permanent connection. As a removable disk, USB disk 32 can be used for booting many different OSs (Microsoft Windows™, Linux, etc.) on the same PC 11. For each OS, a respective USB disk 32 is prepared that contains that OS and that is programmed for booting that OS. The OS of whichever USB disk 32 is connected to PC 11 during power-up is the OS that runs. Furthermore, only a user who has access to such a USB disk 32 is able to power up PC 11, so that the present invention can be used as a security measure to prevent access to PC 11 by unauthorized users.

Conversely, USB disk 32 also is useful as a non-removable device that is permanently installed on the motherboard of PC 11. Here, the main advantage is the elimination of BIOS 14 as a separate component. Because either BIOS 14 or its equivalent (e.g., directly executable memory 34) is needed in any case, the savings are not in the cost of the components, but in reducing the number of pre-programmed elements on board from two (BIOS 14 and hard disk 18) to one (USB disk 32), thus saving in logistics and in manufacturing costs.

Mass storage device 36 may be any memory medium that is compatible with the USB standard, including magnetic USB hard disks and flash USB data disks. There is no particular significance to the technology used for mass storage device 36. On the other hand, there is significance to the technology used in directly executable memory 34: directly executable memory 34 can not use magnetic media but may be based on executable flash media or on any other semiconductor nonvolatile executable media.

Figure 3:
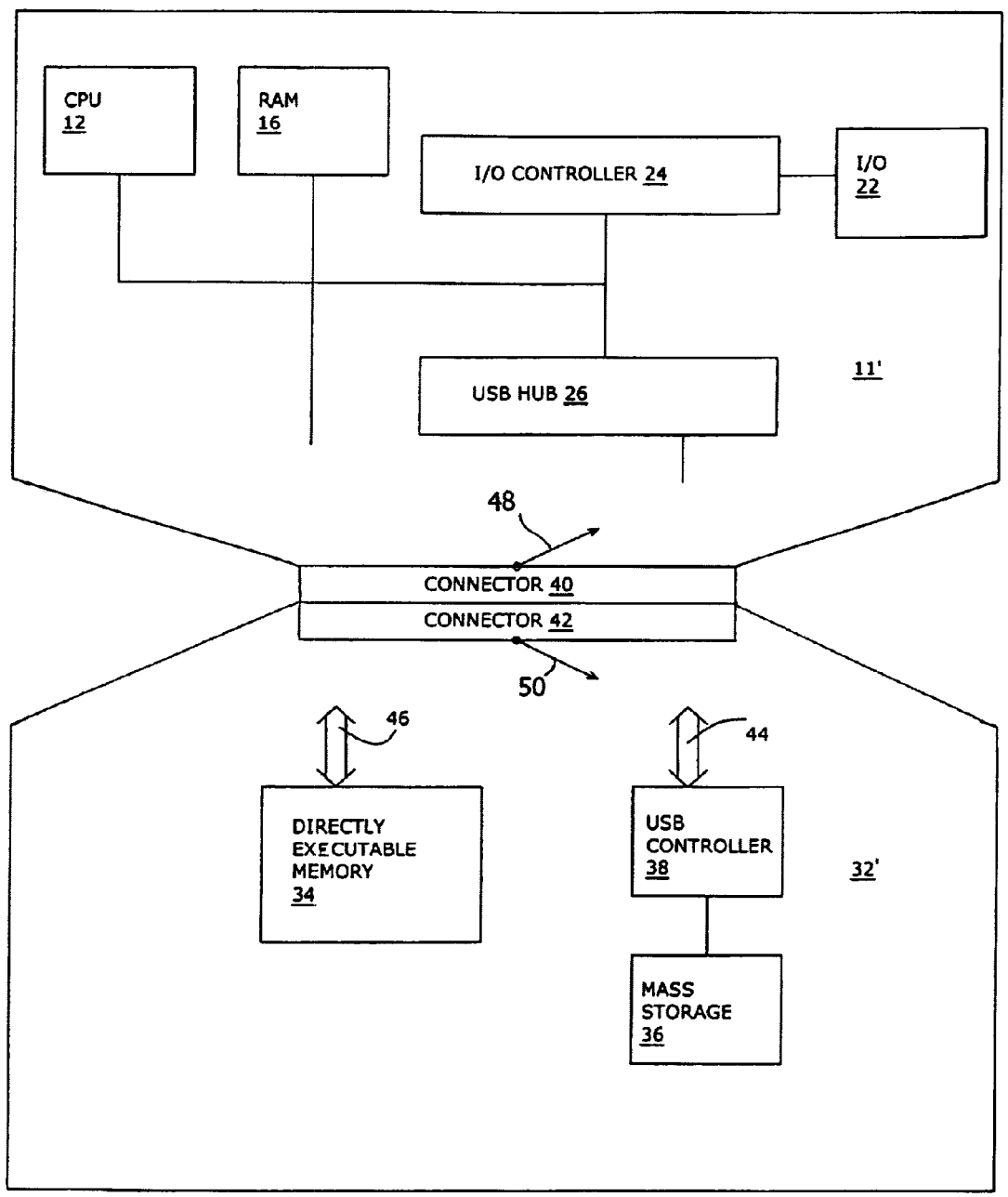

It often is important to minimize the number of pins in connector 42. In some preferred embodiments of the present invention, some or all of the pins of the two interfaces are shared. FIG. 3 is a schematic block diagram of an architecture of the present invention that supports such pin sharing. The architecture of FIG. 3 is the same as the architecture of FIG. 2, except that the respective connectors 40 and 42 of PC 11' and USB disk 32' now include respective switches 48 and 50 that allow connector 42 to use a common set of pins for both USB protocol signals 44 and direct execution protocol signals 46. With switches 48 and 50 pointing to the right, as illustrated, PC 11' exchanges USB protocol signals with USB disk 32'. With switches 48 and 50 pointing to the left, PC 11' exchanges direct execution protocol signals 46 with USB disk 32'.

The boot sequence of the architecture of FIG. 3 is somewhat more complicated than the boot sequence of the architecture of FIG. 2. In order for CPU 12 to execute code directly from directly executable memory 34, switches 48 and 50 must point left; but while switches 48 and 50 point left, the USB interface cannot be accessed. Therefore, only the very initial portion of the boot code stored in directly executable memory 34 is executed by CPU 12 directly from directly executable memory 34, with switches 48 and 50 pointing left. That initial portion of the boot code directs the copying of the boot code to RAM 16. Once the boot code has been copied to RAM 16, switches 48 and 50 are switched to point right, using a dedicated control signal that must be allocated in connectors 40 and 42, and CPU 12 executes the boot code that has not yet been executed from RAM 16 to copy the OS from mass storage device 36 as before. Note that:

(a) it must be ensured that switches 48 and 50 point left on power-up; and (b) the system should not perform a warm reset unless the hardware guarantees that switches 48 and 50 will point left following such warm reset.

Otherwise, the system will hang because CPU 12 will attempt to execute the initial boot code from a device that is not accessible.

While the invention has been described with respect to a limited number of embodiments, it will be appreciated that many variations, modifications and other applications of the invention may be made.

What is claimed is:

1. A memory device comprising:
   (a) a first, directly executable memory for storing boot code of a computer, said boot code including code that is executed first by said computer when said computer is powered up;
   (b) a second memory; and
   (c) a single connector, for operationally connecting said two memories to said computer, that includes:
      (i) a first plurality of pins for supporting communication between said first memory and said computer, and
      (ii) a second plurality of pins for supporting communication between said second memory and said computer,
   said first and second pluralities of pins sharing at least one said pin; and
   (d) a switch for alternately connecting said first memory and said second memory to said computer via said at least one shared pin.

2. The device of claim 1, wherein said operational connection is reversible.

3. The device of claim 1, wherein said operational connection is permanent.

4. The device of claim 1, wherein said first memory is a read-only memory.

5. The device of claim 1, wherein said second memory is for storing an operating system of said computer.

6. The device of claim 1, wherein said second memory is a magnetic disk memory.

7. The device of claim 1, wherein said second memory is a flash memory.

8. The device of claim 1, further comprising:
   (d) a Universal Serial Bus (USB) controller for supporting communication between said second memory and said computer.

9. The device of claim 8, wherein at least one of said memories stores a read-only USB driver.

10. The device of claim 9, wherein said read-only USB driver is stored in said first memory.

11. A computer peripheral device comprising:
    (a) a first component;
    (b) a second component separate from said first component;
    (c) a connector, for operationally connecting said first and second components to a computer, that includes:
       (i) a first plurality of pins for supporting communication between said first component and said computer, and
       (ii) a second plurality of pins for supporting communication between said second component and said computer,
    said first and second pluralities of pins sharing at least one said pin;
    (d) a single Universal Serial Bus (USB) controller for supporting communication only between said first component and said computer; and
    (e) a switch for alternately connecting said first component and said second component to said computer via said at least one shared pin.

12. The device of claim 11, wherein said first component is a memory.

13. The device of claim 12, wherein said memory is a magnetic disk memory.

14. The device of claim 12, wherein said memory is a flash memory.

15. The device of claim 11, wherein said second component is a directly executable memory for storing boot code.

16. The device of claim 15, wherein said connector supports a Low Pin Count (LPC) protocol for said second component.

17. The device of claim 15, wherein said directly executable memory is a read-only memory.

18. The device of claim 11, wherein said operational connection is reversible.

19. The device of claim 11, wherein said second plurality of pins includes separate respective pins for address signals and data signals.

20. A method of operating a computer, comprising the steps of:
    (a) providing at least one memory device including:
       (i) a respective first, directly executable memory, and
       (ii) a respective second memory;
    (b) for each said at least one memory device, storing boot code of the computer in said respective first memory, said boot code including code that is executed first by the computer when the computer is powered up;
    (c) operationally connecting one of said at least one memory device to the computer;
    (d) executing said boot code that is stored in said respective first memory of said one memory device, by the computer and
    (e) for each said at least one memory device, storing an operating system of the computer in said respective second memory;
    wherein said executing of said boot code includes copying said operating system from said respective second memory of said one memory device to the computer;
    wherein, for each said at least one memory device, said boot code includes driver code for said respective second memory;
    and wherein said copying of said operating system from said respective second memory of said one memory device to the computer is effected by executing at least a portion of said driver code.

21. The method of claim 20, wherein said operational connection is reversible.

22. The method of claim 20, wherein said driver code is read-only driver code.

23. The method of claim 20, wherein a plurality of said memory devices are provided, each said memory device having a respective operating system of the computer stored in said second memory thereof; and wherein all said respective operating systems are different.

24. The method of claim 20, wherein all of said boot code is executed directly from said first memory.

25. A memory device comprising:
    (a) a first, directly executable memory for storing boot code of a computer, said boot code including code that is executed first by said computer when said computer is powered up;
    (b) a second memory; and
    (c) a single connector, for operationally connecting said two memories to said computer, that includes:
       (i) a first plurality of pins for supporting communication between said first memory and said computer, said first plurality of pins being for a first access protocol that supports direct execution of said boot code and
       (ii) a second plurality of pins for supporting communication between said second memory and said computer, said second plurality of pins being for a second, serial access protocol.

26. The device of claim 25, wherein said first and second pluralities of pins are separate.

27. The device of claim 25, wherein said first protocol is a Low Pin Count (LPC) protocol.

28. The device of claim 25, wherein said second protocol is a Universal Serial Bus (USB) protocol.

29. A computer peripheral device comprising:
(a) a first component;
(b) a second component separate from said first component;
(c) a connector, for operationally connecting said first and second components to a computer, that includes:
(i) a first plurality of pins for supporting communication between said first component and said computer, and
(ii) a second plurality of pins for supporting communication between said second component and said computer, said communication between said second component and said computer multiplexing said second plurality of pins; and
(d) a single Universal Serial Bus (USB) controller for supporting communication only between said first component and said computer.

30. The device of claim 29, wherein said first and second pluralities of pins are separate.

31. A method of operating a computer, comprising the steps of:
(a) providing at least one memory device including:
(i) a respective first, directly executable memory, and
(ii) a respective second memory;
(b) for each said at least one memory device, storing boot code of the computer in said respective first memory, said boot code including code that is executed first by the computer when the computer is powered up;
(c) operationally connecting one of said at least one memory device to the computer; and
(d) executing said boot code that is stored in said respective first memory of said one memory device, by the computer, by steps including:
(i) executing only a portion of said boot code directly from said first memory;
(ii) copying a remainder of said boot code to a random access memory; and
(iii) executing said reminder of said boot code from said random access memory.

* * * * *

UNITED STATES PATENT AND TRADEMARK OFFICE
CERTIFICATE OF CORRECTION

PATENT NO. : 7,073,013 B2
APPLICATION NO. : 10/611940
DATED : July 4, 2006
INVENTOR(S) : Menahem Lasser It is certified that error appears in the above-identified patent and that said Letters Patent is hereby corrected as shown below:

On the title page, item [73]:

Assignee: should be changed to:     msystems Ltd.

Signed and Sealed this

Eighteenth Day of September, 2007

JON W. DUDAS
*Director of the United States Patent and Trademark Office*